United States Patent [19]

Braun et al.

[11] Patent Number: 5,588,516
[45] Date of Patent: Dec. 31, 1996

[54] SYNCHRONIZER WITH SELF-ENERGIZING

[75] Inventors: Eugene R. Braun, Royal Oak; Otis J. Olson, Farmington Hills, both of Mich.

[73] Assignee: Eaton Corporation, Cleveland, Ohio

[21] Appl. No.: 448,158

[22] Filed: May 23, 1995

Related U.S. Application Data

[63] Continuation-in-part of Ser. No. 408,453, Mar. 22, 1995, abandoned, which is a continuation of Ser. No. 172,789, Dec. 27, 1993, abandoned.

[51] Int. Cl.[6] .............................. F16D 23/08; F16H 3/38
[52] U.S. Cl. .................... 192/48.91; 192/53.33; 74/339
[58] Field of Search .............................. 192/53 E, 53 F, 192/54, 48.91; 74/339

[56] References Cited

U.S. PATENT DOCUMENTS

| | | | |
|---|---|---|---|
| 3,548,983 | 12/1970 | Hiraiwa | 192/53 |
| 4,573,371 | 3/1986 | Akutagawa | 192/53 F X |
| 4,836,348 | 6/1989 | Knodel et al. | 192/53 F |
| 5,092,439 | 3/1992 | Reynolds | 192/53 |
| 5,097,930 | 3/1992 | Reynolds et al. | 192/53 F X |
| 5,335,762 | 8/1994 | Raue | 192/53 F X |

*Primary Examiner*—Andrea L. Pitts
*Attorney, Agent, or Firm*—Paul S. Rulon

[57] ABSTRACT

A baulkring-type synchronizer mechanism (18) includes cone clutch friction surfaces (24,28 and 26,50) and sets jaw clutch teeth (58,28 and 60,30) for frictionally synchronizing and positive connecting gears (14,16) to a shaft (12). Blocker teeth on baulkrings (40,42) prevent asynchronous engagement of the jaw clutch teeth and transmit operator shift forces ($F_o$) from a shift sleeve (34) to the cone clutches. Angled self-energizing surfaces (72a,72b,74a,74b) are affixed to an outer circumference of a hub (32) and engage angled self-energizing surfaces (76a,76b,76c,76d) affixed to a shift sleeve (34) to provide an additive force ($F_a$) that is transmitted via the blocker teeth to the cone clutches. The jaw clutch teeth include axially movable first and second sets of teeth (58,60) defined by the shift sleeve (34) and axially fixed sets of teeth (28,30) secured to the gears. When the sleeve is in a neutral position, the first and second sets of the teeth (58,60) are loosely disposed respectively in portions of grooves in hub (32). When one of the first and second sets of teeth (58,60) are engaged with one of the fixed sets of teeth, the other of the first and second sets is closely received in a portion of its associated groove.

19 Claims, 4 Drawing Sheets

SYNCHRONIZER WITH SELF-ENERGIZING

This is a continuation-in-part of application Ser. No. 08/408,453 filed on Mar. 22, 1995, which is a continuation of application Ser. No. 08/172,789 filed Dec. 27, 1993, both abandoned.

FIELD OF THE INVENTION

This invention relates to a baulkring-type synchronizer having self-energizing.

BACKGROUND OF THE INVENTION

Baulkring-type synchronizer mechanisms for use in multi-ratio transmissions are well known. Such mechanisms include pairs of friction and jaw members for respectively synchronizing and positive clutching a gear to a shaft, pre-energizer assemblies for engaging the friction members in response to initial engaging movement of a shift sleeve, a hub rotatably fixed to the shaft and having external spline teeth slidably receiving internal spline teeth of the shift sleeve which often defines one of the jaw member pairs, a baulkring having blocker teeth for arresting engaging movement of the shift sleeve until synchronization is reached and for transferring a shift force from the sleeve to increase the engaging force of the friction members.

It is also known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for trucks, particularly for heavy duty trucks. A baulkring-type synchronizer of the self-energizing type may be seen by reference to U.S. Pat. No. 3,548,983, which is incorporated herein by reference. A pin-type synchronizer of the self-energizing type may also be seen by reference to U.S. Pat. No. 5,092,439, which is also incorporated herein by reference.

SUMMARY OF THE INVENTION

An object of this invention is to provide a baulkring-type synchronizer with improved self-energizing.

According to a feature of the invention, a clutch mechanism frictionally synchronizes and positive connects first and second drive members disposed for relative rotation about a common axis. The clutch mechanism comprises first drive means including a plurality of circumferentially spaced apart first drive teeth and a first drive friction surface affixed to the first drive member. A hub affixed to the second drive member includes an outer circumference and first and second axially oppositely facing ends. The outer circumference includes a plurality of first grooves defined by flank surfaces of circumferentially spaced apart external splines. A baulkring is axially interposed the hub and first drive means and is axially movable therebetween. The baulkring includes circumferentially spaced apart blocker teeth with axially facing ends thereof in the direction of the hub having first angled blocker surfaces. The baulkring also includes a second friction surface engageable with the first drive friction surface for producing a synchronizing torque and abutment means for limiting rotation of the baulkring relative to the hub. A shift sleeve has an inner circumference and first and second ends respectively facing in the same axial directions as the hub first and second ends. The inner circumference includes a plurality of circumferentially spaced apart first teeth axially movable from a neutral position disposed in the first grooves to engaged positions with the first drive teeth in response to an axially directed shift force ($+F_o$) acting on the sleeve. The sleeve first teeth in the axial direction of the blocker ring include ends at the sleeve first end having angled blocker surfaces. Pre-energizer means are operative in response to initial axial movement of the sleeve from the neutral position to move the baulkring friction surface into engagement with the first drive friction surface for rotating the baulkring angled blocker surfaces to positions engaged by the sleeve first angled blocker surfaces for blocking asynchronous engagement of the first drive teeth and the sleeve first teeth, for transmitting the shift force across the engaged blocker surfaces to effect an increased engagement force of the baulkring friction surface with the first drive friction surface, and for producing via the angled blocker surfaces a torque counter to the synchronizer torque for moving the baulkring and sleeve first teeth angled blocker surfaces out of engagement as synchronization is reached. Self-energizing means including first angled self-energizing surfaces that are affixed to the sleeve and hub, and that are movable into engagement in response to engagement of the blocker surfaces and relative rotation between the sleeve and hub. The angled self-energizing surfaces are positioned oblique to a plane normal to the axis and are operative when engaged to react the synchronizing torque for producing an additive axial force ($+F_a$) transmitted across the blocker surfaces in the direction of the shift force ($+F_o$) for further increasing the engagement force of the friction surfaces.

The clutch mechanism is characterized by the shift sleeve first teeth having a length extending axially from the sleeve first end toward the sleeve second end. The sleeve inner circumference includes a plurality of circumferentially spaced apart second teeth extending axially from the sleeve second end toward the sleeve first end. Adjacent pairs of the first and second teeth having a combined length less than or equal to the axial length of the sleeve. The hub includes a plurality of second grooves defined by flank surface of the splines and alternately spaced between the first grooves and slidably receiving the sleeve second teeth. The flank surfaces of axially extending portions of the first and second grooves respectively having at least a portion of the sleeve first and second teeth disposed therein during the neutral position and the engaged position of the blocker surfaces. The flank surfaces of the axially extending portions having a circumferential spacing relative to the teeth therein for allowing the relative rotation between the sleeve and hub to effect engagement of the self-energizing surfaces, and the flank surfaces of another axially extending portion of the second grooves closely receiving the sleeve second teeth when the first drive and sleeve first teeth are engaged for preventing relative rotation therebetween.

BRIEF DESCRIPTION OF THE DRAWINGS

The synchronizer of the invention is shown in the accompanying drawings in which.

DETAILED DESCRIPTION OF THE DRAWINGS

The term "synchronizer clutch mechanism" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing clutch in proportion to the synchronizing torque of the friction clutch.

Looking now at FIGS. 1–8, therein is shown a gear and synchronizer assembly 10 which forms part of a multi-ratio change speed transmission. Assembly 10 includes a partially shown shaft 12 mounted for rotation about a central axis 12a, axially spaced apart gears 14, 16 supported on the shaft for rotation relative thereto and secured against axial movement relative to the shaft in known manner, and a double-acting synchronizer clutch mechanism 18.

The synchronizer clutch mechanism 18 includes annular member 20,22 axially and rotatably affixed to gear 14, 16 in known manner, gear friction surfaces 24,26 herein integral with members 20,22, gear jaw teeth 28,30 herein integral with members 20,22, a hub member 32 axially and rotatably affixed at a central opening 32a hereof to shaft 12 and having axially oppositely facing ends 32b,32c and an outer circumference 32d, a shift sleeve 34 having axially oppositely facing ends 34a,34b defining the sleeve length, sets of internal spline teeth 36 defined on a central opening or an inner circumference 34c of sleeve 34, sets of external splines 38,39 defined on the outer circumference 32d of hub 32, baulkrings 40,42, blocker teeth 44,46 and friction surfaces 48,50 herein integral with baulkrings 40,42, pre-energizer assemblies 52, and self-energizer assemblies 54 best seen in FIGS. 3–8. Herein, the synchronizer includes three circumferentially spaced apart pre-energizer assemblies and three self-energizing assemblies circumferentially interposed between pre-energizer assemblies. Each blocker tooth respectively includes angled blocker surfaces 44a,44b and 46a,46b.

The sets of internal spline teeth 36 comprise three teeth 56 extending the axial length of shift sleeve 34, three first sets 58 of eight teeth each circumferentially positioned between teeth 56, and three second sets 60 of eight teeth each also circumferentially positioned between teeth 56. Each set may include a greater or lesser number of teeth. FIGS. 3–8 each illustrate two of the teeth 56 and the eight teeth of each first and second set 58,60. Each tooth 56 has a jaw tooth portion 56a,56b at its opposite ends and a detent groove 56c for the pre-energizer assembly 52. The first and second sets of teeth 58,60 include four teeth 58a,60a of intermediate length, two short teeth 58b,60b, and two long teeth 58c,60c. Each of the teeth 58,60,56a,56b include angled blocker surfaces 58d,58e and 60d,60e which cooperate with the blocker surface of blocker teeth 44,46 in known manner. Alternatively, teeth 58,60 may all be of intermediate length. Herein, the long teeth are to ensure disengagement of teeth 58 and 60 from teeth 28,30 as may be seen by reference to FIG. 8. Therein, long teeth remain engaged with blocker teeth 44 while they engaged with jaw teeth 28, thereby ensuring disengaging movement of sleeve 34 without interference by the back sides of the blocker teeth. Other ways may be used to ensure disengagement, for example, the back sides of the blocker teeth may have angled surfaces. Flank surfaces of teeth 56a,56b,58,60 and 28,30 are provided with an antibackout or locking angle feature to prevent inadvertent disengagement of the teeth. Details of this feature may be seen by reference to U.S. Pat. No. 4,727,968 which is incorporated herein by reference.

The external sets of splines 38,39 define first and second sets of alternately spaced grooves 62,64 respectively receiving the first and second sets of teeth 58,60. Spline flank surfaces 38a,39a and 38c,39c of axially extending portions of each first and second groove 62,64 have a circumferential spacing relative to teeth 58,60 to allow limited relative rotation between the sleeve and hub for effecting engagement of the self-energizing assemblies 54, as explained hereinafter. Flank surfaces 38b,39b and 38d,39d of axially extending portions at the other end of each second and first groove 64,62 having a closer circumferential spacing relative to teeth 60,58 for preventing relative rotation between the sleeve and hub when one of the sets of teeth is engaged with the associated jaw teeth affixed to one of the gears.

Each pre-energizer assembly 52, which is known in the art, includes a helical compression spring 66 and plunger 68 disposed in a radially extending blind bore in hub 32 and biasing a roller or ball 70 (herein a roller) into the annular detent groove 56c in shift sleeve splines 36. Pre-energizer assembly 52 resiliently positions shift sleeve 34 in the neutral position shown in FIGS. 1 and 3. Rollers 70 are axially spaced between abutment surfaces 40a,42a defined by tabs 40b,42b extending from baulkrings 40,42 into abutment recesses 32e of hub 32 with free circumferential play in known manner for limiting relative rotation of the baulkrings relative to the hub.

The self-energizing assemblies 54 each include a first projection 72 extending radially outward form the hub outer circumferential surface 32d and defining V-shaped or angled self-energizing surfaces 72a,72b facing circumferentially in one direction and oblique to a plane normal to shaft axis 12a, a second projection 74 extending radially outward from the hub outer circumferential surface 32d and defining V-shaped or angled self-energizing surfaces 74a,74b oblique to the plane and circumferentially facing surfaces 72a,72b with a recess therebetween of hourglass like shape when viewed radially relative to the shaft axis, and a projection 76 extending radially inward from the sleeve inner circumferential surface 34c and into the hourglass recess. Projection 76 includes angled self-energizing surfaces 76a,76b,76c,76d respectively disposed parallel to surfaces 72a,72b,74a,74b. The parallel self-energizing surfaces, when engaged, provide an additive axial force ($F_a$) to decrease synchronization time and/or decrease operator shift effort. Each projection 76 also includes nonself-energizing surfaces 76e,76f normal to the plane and respectively operative in the shift sleeve neutral position to engage nonself-energizing surfaces 72c, 74c parallel thereto. The nonself-energizing surfaces prevent unwanted activation of the self-energizing surfaces in the event there is some amount of torque produced by one of the cone clutches, e.g., viscous shear of oil between the cone clutch friction surfaces may produce a torque that could activate the ramps.

When it is desired to couple either gear to the shaft, an appropriate and unshown shift mechanism, such as disclosed in U.S. Pat. No. 4,920,815 and incorporated herein by reference, moves shift sleeve 34 axially via a partially shown shift fork 78 along the axis of shaft 12 either left to couple gear 14 or right to couple gear 16. Herein, the left and right directions are taken as positive and negative directions, respectively. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, pre-energizer assemblies apply a pre-energizer force proportional to the force applied by the operator to the shift sleeve. Whether manually or automatically applied, the force is applied to the shift sleeve in an axial direction and is proportional to the force ($F_o$) in FIG. 9. The pre-energizer force, depending on direction of shift sleeve movement by the shift force ($F_o$), moves either friction surface 48 or 50 into initial engagement with its associated friction surface to clock the associated baulkring to a position relative to hub 32 for positioning the blocker surfaces and the self-energizing surfaces in a manner explained hereinafter.

Figure 1:
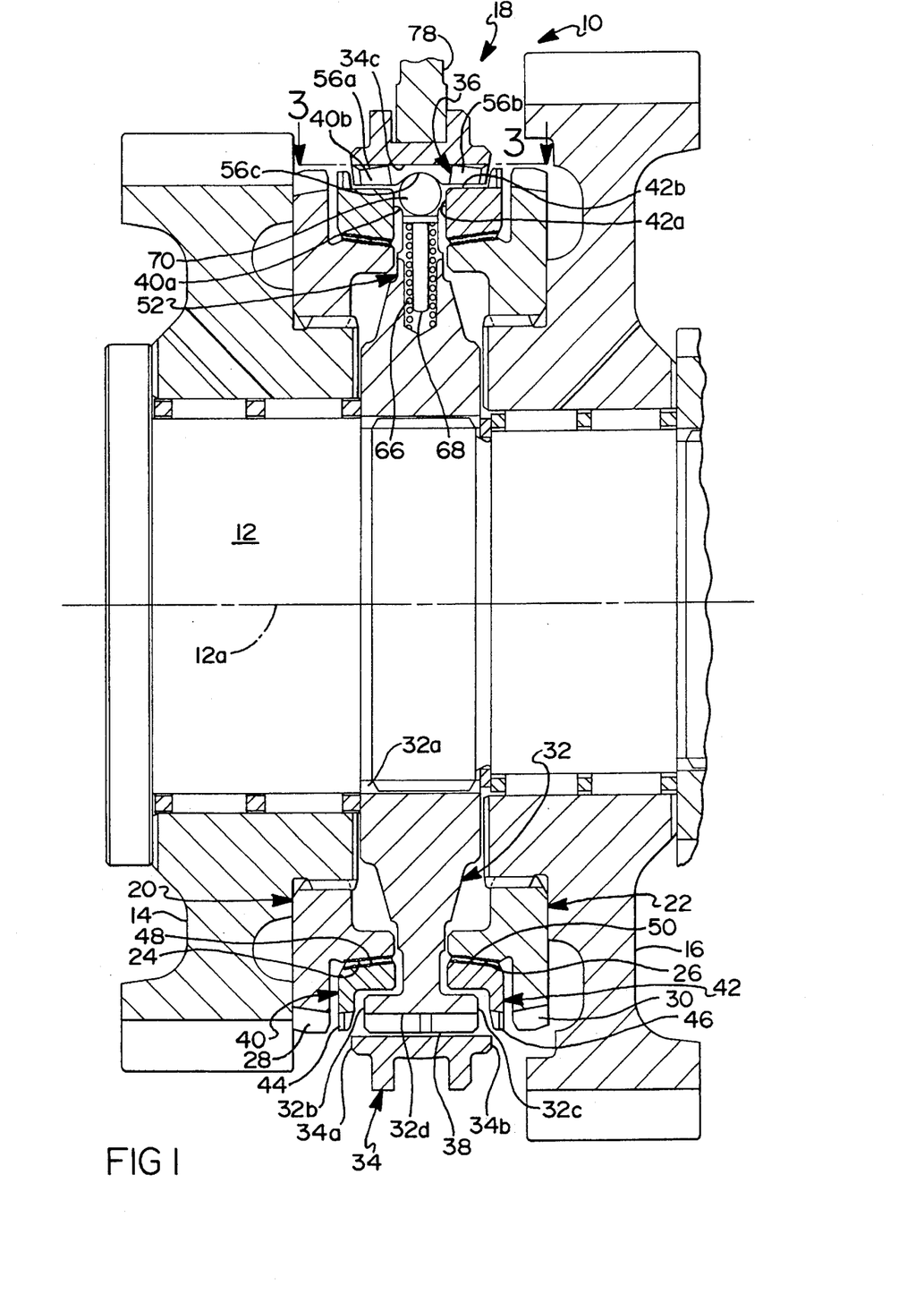
FIG. 1 is a sectional view of a double-acting baulkring-type synchronizer in a neutral position and disposed for rotation about the axis of a shaft.
Figures 2, 4, 4A, 9:
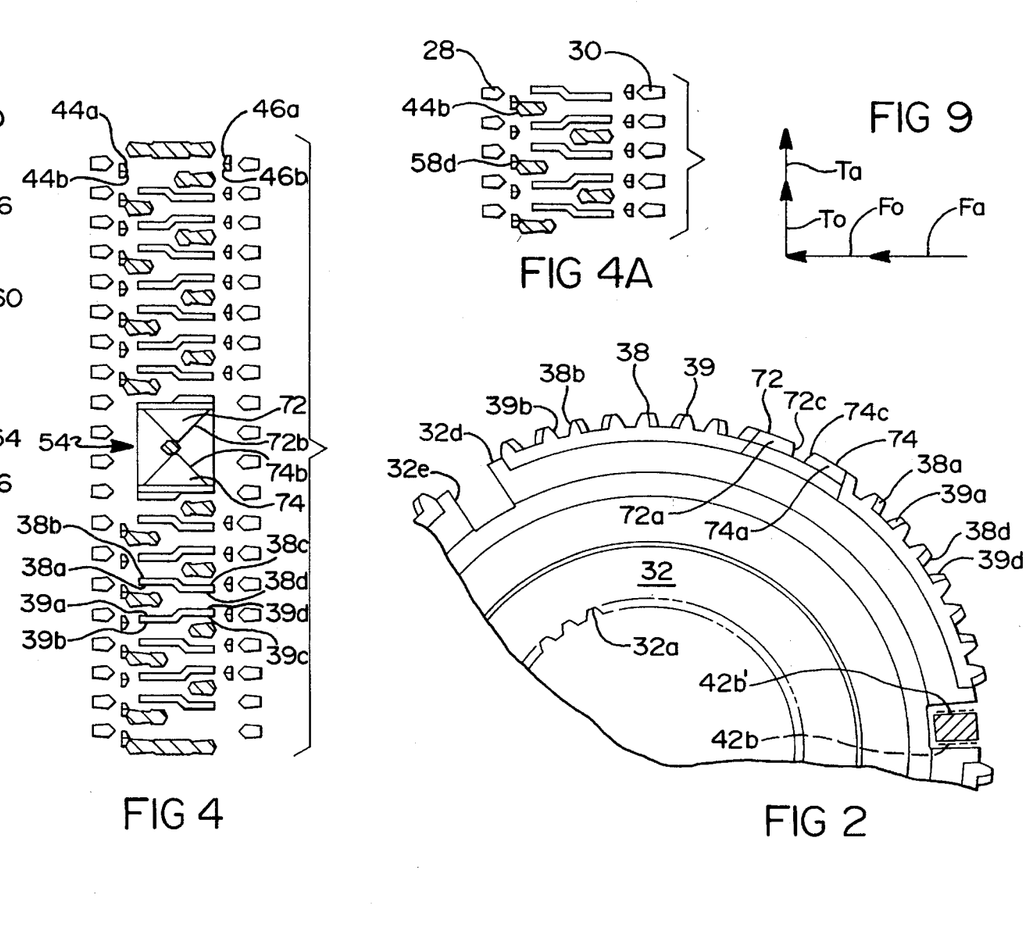
FIG. 2 is relief view of a broken away portion of a hub member looking axially leftward relative to the shaft in FIG. 1.
FIGS. 3–8 several stages of operation of the synchronizer components looking radially inward along line 3—3 in FIG. 1.
FIG. 9 is a graphical representation of axial forces and torques acting across blocker surfaces of the synchronizer mechanism.
Figure 5:
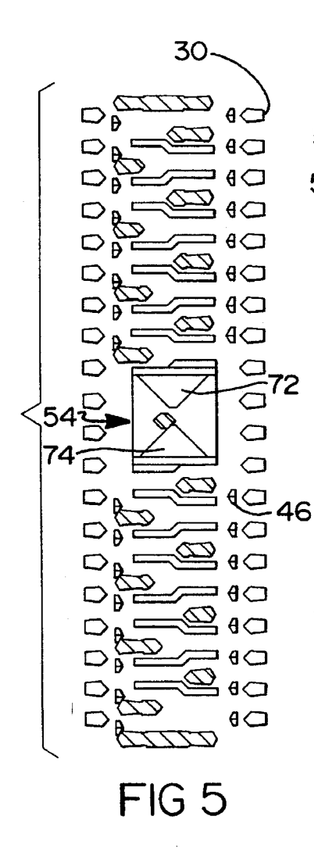

Initial leftward axial movement (positive) of shift sleeve 34 by the operator shift force $+F_o$ is transmitted by pre-energizer rollers 70 to baulkring 40 via tab abutment surfaces 40a to effect initial frictional engagement of movable cone surface 48 with gear cone surface 24. The initial engagement force of the cone surfaces is, of course, a function of the force of spring 66 and the angles of the walls of detent grooves 56c. The initial frictional engagement (provided an asynchronous condition exists and momentarily ignoring the effect of the self-energizing surfaces) produces an initial cone clutch engaging force and synchronizing torque $T_o$ which ensures limited relative rotation between shift sleeve 34 and baulkring 40, and hence, movement of the blocker teeth 44 to a position wherein the correct angled blocker surfaces of the blocker teeth engage the correct angled blocker surfaces of spline teeth 58. As shown in FIGS. 4 and 5, when the blocker surfaces are engaged, the full operator shift force $+F_o$ on shift sleeve 34 is transmitted to friction surfaces 24,48 via angled blocker surfaces 44b, 58d, whereby the cone clutch is engaged by the full force of the operator shift force $+F_o$ to provide the operator synchronizer torque $T_o$. This operator synchronizing torque $T_o$ is represented by arrow $T_o$ in FIG. 9. Since the blocker surfaces are disposed at angles relative to the axial direction of operator shift force $+F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker teeth move out of engagement to allow continued axial movement of the shift sleeve and engagement of movable jaw teeth 58 with gear jaw teeth 28.

Tabs 40b,42b normally have enough free play to allow angled blocker surfaces 44a,44b and 46a,46b to rotate enough to initially make full contact with the respective mating angled blocker surfaces 58d,58e and 60d,60e. Such initial full contact for surfaces 44b,58d is shown in FIG. 4. During tests of synchronizer clutch mechanism 18 with such initial full contact of the blocker surfaces, premature unblocking occurred from time to time. The premature unblocking was prevented by increasing the amount of free play so that the blocker surfaces initially contacted as shown in FIG. 4A. Herein, this was done by decreasing the circumferential width of the tabs, as shown in FIG. 2, wherein phantom lines 42b illustrate the original circumferential width and solid lines 42b' illustrate the reduced circumferential width.

Still ignoring the effects of the self-energizing ramps, cone clutch torque provided by the force $F_o$ is expressed by the following equation:

$$T_o = F_o R_c \mu_c / \sin\alpha$$

where:
$R_c$=the mean radius of the cone friction surface,
$\mu_c$=the coefficient of friction of the cone friction surface, and
$\alpha$=the angle of the cone friction surfaces.

Looking now at the affects of the self-energizing surfaces and referring particularly to FIGS. 3–8, the synchronizing torque $T_o$, due to the operator applied axial shift force $+F_o$, is of course transmitted to shift sleeve 34 by the angled blocker surfaces and is reacted to shaft 12 across the self-energizing surfaces. The self-energizing ramp surfaces, when engaged, limit rotation of the shift sleeve relative to shaft 12 and produce the axial force component or axial additive force $+F_a$ acting on the shift sleeve in the same direction as shift force $+F_o$, thereby further increasing the engaging force of the cone clutch to provide an additive synchronizing torque $T_a$ which adds to the torque $T_o$.

Figure 3:
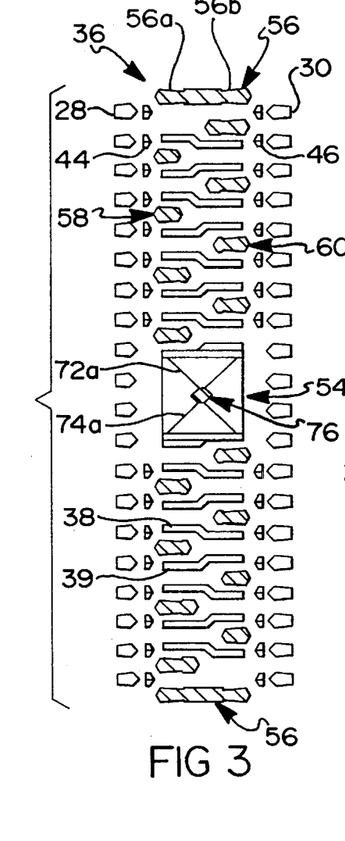

FIG. 3 illustrates a "neutral position" of all synchronizer components. However, at the start of a shift blocker teeth 44,46 may be circumferentially positioned any place between the limits allowed by baulkring tabs 40b,42b and hub recesses 32e. Initial leftward axial movement of shift sleeve 34 by the operator shift force $+F_o$ engages cone clutch surfaces 24,48 as previously described. The components of FIG. 4 are in a "pre self-energized position" wherein the friction surfaces are engaged enough to start transmitting torque and start to rotate baulkring 40 relative to the hub and shift sleeve enough to engage blocker surfaces 44b,58d but not enough to engage self-energizing surfaces 74a,76c. In the "blocking/self-energizing position" of FIG. 5, full operator shift force $+F_o$ is transmitted across the blocker surfaces and the torque $T_o$ resulting therefrom is reacted to shaft 12 via now engaged self-energizing surfaces 74a,76c.

The engaged self-energizing surfaces, as previously mentioned, produce the axial additive force $+F_a$ acting in the same direction as operator shift force $+F_o$ and transmitted across the engaged blocker surfaces, thereby further increasing the engaging force of the friction surfaces to provide an additive synchronizing torque which adds to the torque $T_o$. FIG. 9 graphically illustrates the sum of the axial forces $+F_o$ plus $+F_a$ engaging the clutch friction surfaces and the sum of the synchronizing torques $T_o$ plus $T_a$ produced by the clutch friction surfaces. For a given operator shift force $+F_o$ and an operator synchronizing torque $T_o$, the magnitude of the axial additive force is preferably a function of the angle of the engaged self-energizing ramp surfaces. This angle is preferably great enough to produce an additive force $+F_a$ of magnitude sufficient to increase synchronizing torque and decrease synchronizing time in response to a given moderate shift effort by the operator. However, this angle is also preferably low enough to produce a controlled axial additive force $+F_a$, i.e., the force $+F_a$ should increase or decrease in response to the force $F_o$ increasing or decreasing. If the ramp angle is too great, the ramps are self-locking rather than self-energizing; hence, once initial engagement of the cone clutch is effected, the force $+F_a$ will rapidly and uncontrollably increase independent of the force $+F_o$, thereby driving the cone clutch toward lockup. Self-locking rather than self-energizing decreases shift quality or shift feel, may over stress synchronizer components, may cause over heating and rapid wear of the cone clutch surfaces, and may even override operator movement of the shift lever.

If no additive axial force is preferred for an up or downshift of a gear, the ramp surfaces for the up or downshift may be made parallel to the axis of shaft 12. For example, if ramp surfaces 74a,76c are made parallel, no additive force $F_a$ is provided for the illustrated shift.

The main variables for calculating self-energizing surface angles for providing additive axial forces $F_a$ are cone clutch angle, cone clutch coefficient of friction, mean radii ratio of the cone clutch and the self-energizing ramps, ramp coefficient of friction, and angle of the self-energizing surfaces. Further details for calculating and controlling self-energizing or boost forces may be obtained by reference to U.S. Pat. No. 5,092,439 which, as previously mentioned, is incorporated herein by reference.

Figure 6:
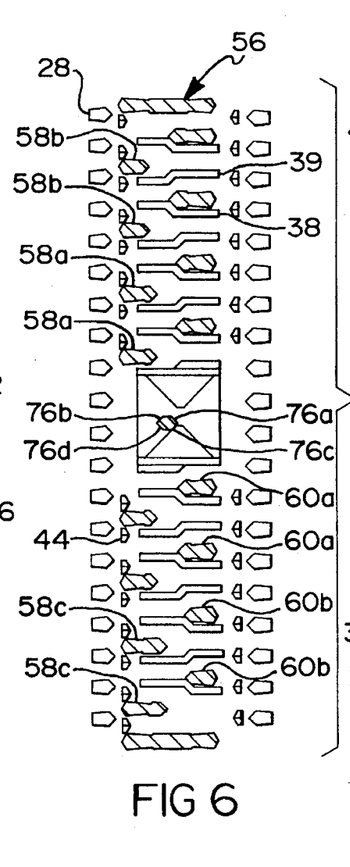
Figure 7:
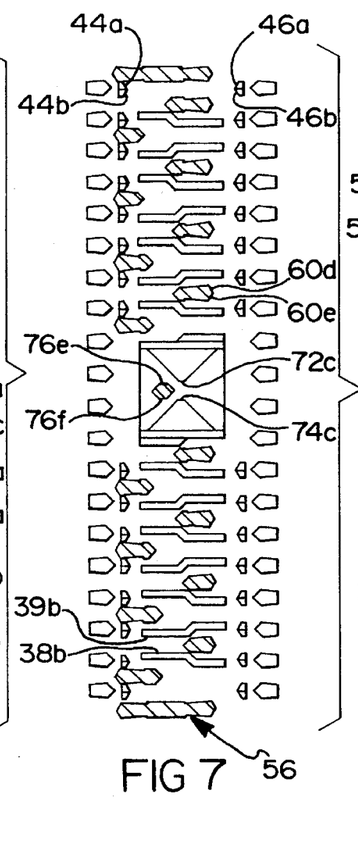
Figure 8:
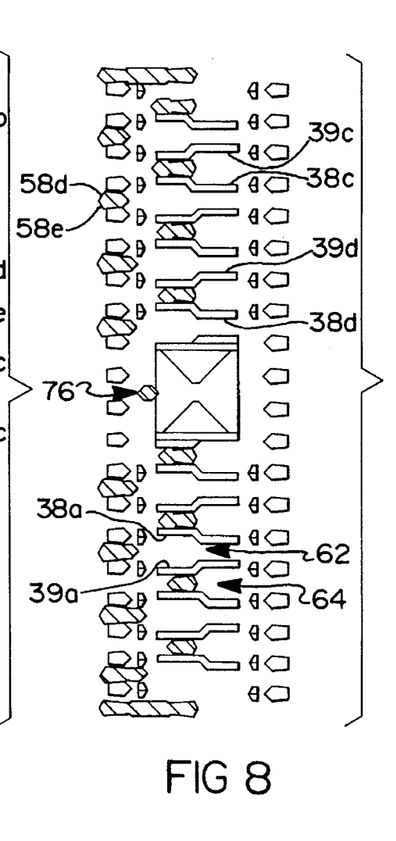

FIG. 6 illustrates a "boosted/unblocked position" which occurs immediately after unblocking torque has separated the blocking surfaces. Self-energizing which occurs in this position may be due to inertia and/or while there is less than complete disengagement of the cone clutch. The assist force helps to restart axial engaging movement of jaw teeth 58 toward engagement with jaw teeth 28 as unblocking occurs and helps move the jaw teeth into engagement when the V-shaped ends of teeth 58 and 28 engage. The assist force lessens what is known as shift notchiness by decreasing the need for the operator to move the shift lever with extra effort to finish a shift as unblocking occurs, i.e., the assist force facilitates smooth and relatively effortless completion of shifts. FIG. 7 illustrates an "end of boost position" and FIG. 8 illustrates a full "engaged position" of jaw teeth 58,28.

Figure 10:
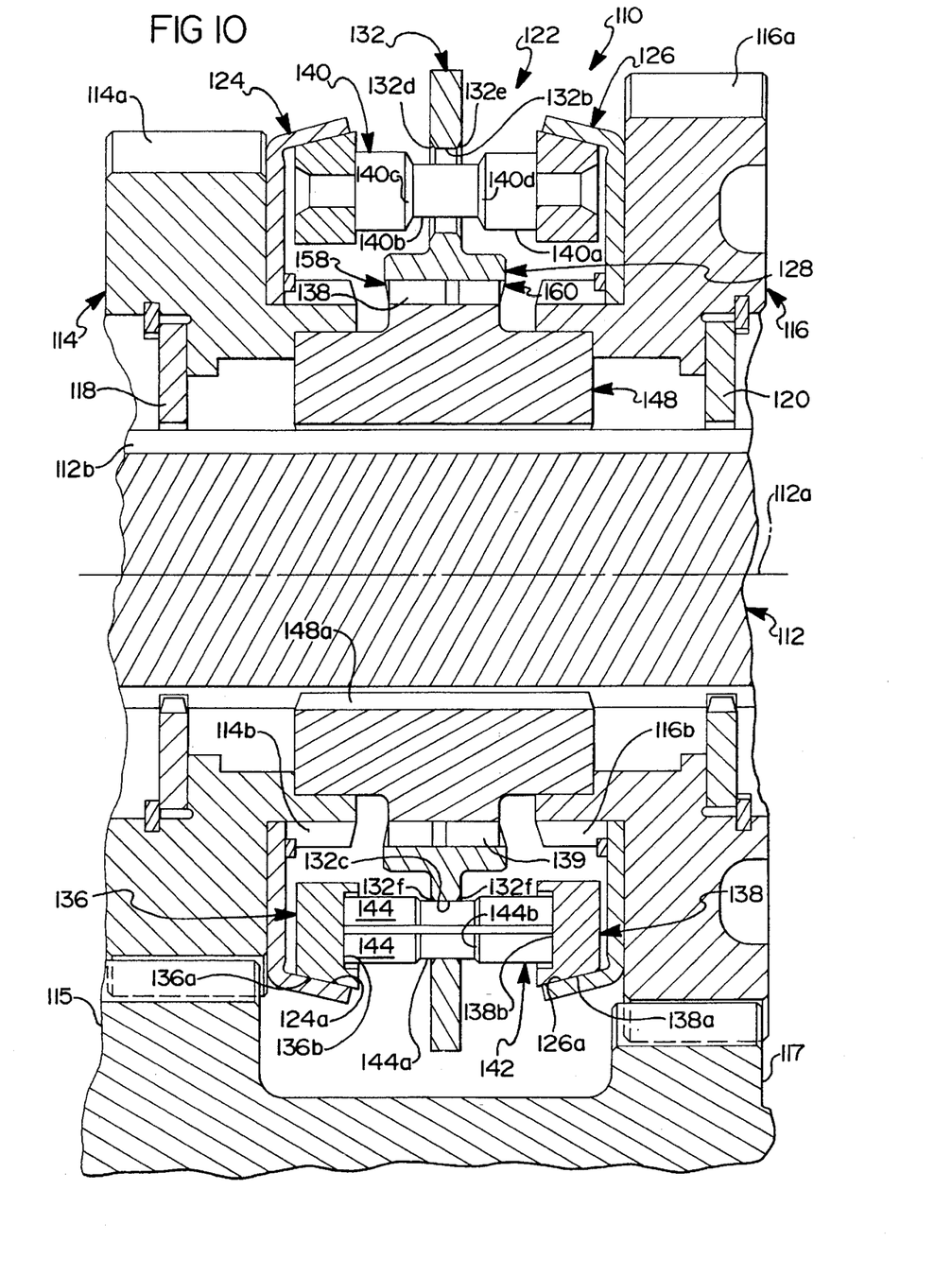
FIG. 10 is a sectional view of a double-acting pin-type synchronizer in a neutral position and disposed for rotation about an axis of a shaft, and including the invention disclosed in FIGS. 1–9.

Looking now at FIG. 10, therein is illustrated an alternative synchronizer assembly 110 employing pin-type blockers 140 in lieu of the blocker teeth 44 and split pin-type pre-energizers 142 in lieu of pre-energizers 52 in FIGS. 1–8. Assembly 110 employs teeth 138, 139, 158 and 160 analogous to teeth 38, 39, 58 and 60, and unshown self-energizers analogous to self-energizers 54 as in the embodiment of FIGS. 1–8.

More specifically, assembly 110 includes a rotatably mounted shaft 112 with an axis 112a, spaced apart ratio gears 114, 116 rotatably supported on the shaft and secured against axial movement relative to the shaft by annular thrust members 118, 120 affixed to the shaft in known manner, and a double acting pin-type synchronizer clutch mechanism 122. Gears 114, 116, which are analogous to gears 14, 16, include teeth 114a, 116a in constant mesh with countershaft gears 115, 117.

The synchronizer mechanism 122 includes annular friction members 124, 126 and annular jaw teeth 114b, 116b affixed to gears 114, 116, a shift sleeve 128 having a flange 132 extending radially outward therefrom, annular friction members or rings 136, 138 rigidly secured together by three circumferentially spaced apart pins 140 extending axially from each of the friction members and through openings 132b in the flange.

As is readily seen, friction members 124, 136 and 126, 138 pair up to define friction clutches for synchronizing the gears to the shaft prior to engagement of the jaw clutches. Cone shaped friction clutches are preferred; however, other types of friction clutches may be used. Friction members 124, 126 may be affixed to the associated gears in any of several known ways, e.g., by welding, or, as is known in the art, they may be formed integral with the gears. Herein, members 124, 126 have internal teeth that mate with jaw teeth 114b, 116b for circumferential retention to the gears; axial retention is provided by retention rings in known manner. Friction members 124, 126 have internal cone friction surfaces 124a, 126a which respectively mate with external cone friction surfaces 136a, 138a. Members 124, 126 and 136, 138 also are respectively referred to as synchronizer cups and rings.

Each pin 140 includes major diameter portions 140a having diameters slightly less than the diameter of flange openings 132b, a reduced diameter portion 140b spaced between friction rings 136, 138 (herein midway), and conical blocker shoulders or surfaces 140c, 140d extending radially outward from the pin axis and axially away from each other at angles relative to a line normal to the pin axis. Surfaces 140c, 140d provide blocking until synchronism is substantially reached. The reduced diameter portions, when disposed within their respective flange openings, allow limited rotation of the rigid friction ring and pin assembly relative to the flange to effect engagement of the pin blocker shoulders with chamfered blocker shoulders 132d, 132e defined about the flange openings.

Pre-energizer assemblies 142 are of the split pin-type disclosed in U.S. Pat. No. 4,252,222 which is incorporated herein by reference. Each assembly 142 includes a pair of semi-cylindrical shell halves 144 having a major diameter less than the diameter of openings 132c when squeezed together, semi-annular grooves 144a with chamfered ends 144b and a leaf spring 146 for biasing the annular grooves apart to engage the groove chamfers with flange chamfers 132f formed about opposite ends of openings 132c. The ends of the shell halves 144 abut friction rings 136, 138 and are disposed within elongated recesses 136b, 138b therein.

Shift sleeve 128 is slidably positioned about the outer circumference of a hub 148 axially retained between gears 114, 116. The hub includes internal spline teeth 148a mating with external spline teeth 112b in shaft 112 to prevent relative rotation therebetween. The spline arrangement between sleeve 128 and hub 148 is substantially the same as in FIGS. 1–8 with the exception that the blocker teeth 44 and sleeve spline teeth 56 are not needed. Operation of the mechanisms in FIGS. 1–8 and 10 is substantially the same.

Two embodiment of a synchronizer mechanism with self-energizing has been disclosed. Many variations and modifications of the embodiments are believed to be within the spirit of the invention. The following claims are intended to cover the inventive portions of disclosed mechanism and variations and modifications believed to be within the spirit of the invention.

What is claimed is:

1. A clutch mechanism for frictionally synchronizing and positive connecting first and second drive members disposed for relative rotation about a common axis; the clutch mechanism including:

first drive means including a plurality of circumferentially spaced apart first drive teeth and a first drive friction surface affixed to the first drive member;

a hub affixed to the second drive member and including an outer circumference and first and second axially oppositely facing ends, the outer circumference including a plurality of first grooves defined by flank surfaces of circumferentially spaced apart external splines;

a first baulkring axially interposed between the hub and the first drive means and axially movable therebetween, the baulkring including circumferentially spaced apart angled blocker surfaces axially facing in the direction of the hub, the baulkring including a friction surface engageable with the first drive friction surface for producing a synchronizing torque, and the baulkring including abutment means for limiting rotation of the baulkring relative to the hub;

a shift sleeve having an inner circumference and an axial length defined between first and second axially facing ends thereof, the inner circumference including a plurality of circumferentially spaced apart first teeth axially movable from a neutral position disposed in the first grooves to engaged positions with the first drive teeth in response to an axially directed shift force ($+F_o$) acting on the sleeve, the sleeve first teeth in the direction of the baulkring including ends at the sleeve first end having angled blocker surfaces;

pre-energizer means operative in response to initial axial movement of the sleeve from the neutral position to move the baulkring friction surface into engagement with the first drive friction surface for rotating the baulkring angled blocker surfaces to positions engaged by the sleeve first teeth angled blocker surfaces for blocking asynchronous engagement of the first drive teeth and sleeve first teeth, for transmitting the shift force ($+F_o$) across the engaged blocker surfaces to effect an increased engagement force of the baulkring friction surface with the first drive friction surface, and for producing via the angled blocker surfaces a torque counter to the synchronizing torque for moving the baulkring and sleeve first teeth angled blocker surfaces out of engagement as synchronization is reached;

self-energizing means including first angled self-energizing surfaces affixed to the sleeve and hub and movable into engagement in response to engagement of the blocker surfaces and relative rotation between the sleeve and hub, the angled self-energizing surfaces positioned oblique to a plane normal to the axis and operative when engaged to react to the synchronizing torque for producing an additive axial force ($+F_a$) transmitted across the blocker surfaces in the direction of the shift force ($+F_o$) for further increasing the engagement force of the friction surfaces; the improvement comprising:

the sleeve first teeth having a length less than the sleeve length and extending axially from the sleeve first end toward the sleeve second end, the sleeve inner circumference including a plurality of circumferentially spaced apart second teeth extending axially from the sleeve second end toward the sleeve first end, adjacent pairs of the first and second teeth having a combined length less than or equal to the axial length of the sleeve;

the hub including a plurality of second grooves defined by flank surfaces of the splines and alternately spaced between the first grooves and slidably receiving the sleeve second teeth, the flank surfaces of axially extending portions of the first and second grooves respectively having at least a portion of the sleeve first and second teeth disposed therein during the neutral position and the engaged position of the blocker surfaces, the flank surfaces of the axially extending portions having a circumferential spacing relative to the teeth therein for allowing the relative rotation between the sleeve and hub to effect engagement of the self-energizing means, and the flank surfaces of another axially extending portion of the second grooves closely receiving the sleeve second teeth when the first drive and sleeve first teeth are engaged for preventing relative rotation therebetween.

2. The clutch mechanism of claim 1, wherein the angled self-energizing surfaces include:

a plurality of the self-energizing surfaces formed in the hub outer circumference and circumferentially spaced apart; and a plurality of the self-energizing surfaces formed in the shift sleeve inner circumference and circumferentially spaced apart.

3. The clutch mechanism of claim 1, wherein:

the abutment means includes means for increasing rotation of the baulkring relative to the hub for changing initial contact of the blocker surfaces from substantially full initial contact to a reduced initial contact.

4. The clutch mechanism of claim 1, further including:

a third drive member disposed for rotation about the common axis relative to the first and second drive members and axially spaced from the first drive member;

second drive means including a plurality of circumferentially spaced apart third drive teeth and a third drive friction surface affixed to the third drive;

a second baulkring axially interposed the hub and second drive means and axially movable therebetween, the second baulkring including circumferentially spaced apart blocker teeth with axially facing ends thereof in the direction of the hub having angled blocker surfaces, the second baulkring including a friction surface engageable with the third drive friction surface for producing a synchronizing torque, and the second baulkring including abutment means for limiting rotation of the second baulkring relative to the hub;

the sleeve second teeth axially movable from a neutral position disposed in the second grooves to engaged positions with the third drive teeth in response to an axially directed shift force ($-F_o$) acting on the sleeve in the direction of the second drive means, the sleeve second teeth in the direction of the second baulkring including ends at the sleeve second end having angled blocker surfaces;

the pre-energizer means operative in response to initial axial movement of the sleeve toward the second drive means from the neutral position to move the second baulkring friction surface into engagement with the third drive friction surface for rotating the second baulkring angled blocker surfaces to positions engaged by the sleeve second teeth angled blocker surfaces for blocking asynchronous engagement of the third drive teeth and sleeve second teeth, for transmitting the shift force ($-F_o$) across the engaged blocker surfaces to effect an increased engagement force of the second baulkring friction surface with the third drive friction surface, and for producing via the engaged blocker surfaces a torque counter to the synchronizing torque for moving the second baulkring and sleeve second teeth angled blocker surfaces out of engagement as synchronization is reached;

the self-energizing means including second angled self-energizing surfaces affixed to the sleeve and hub and movable into engagement in response to engagement of the second baulkring and sleeve second teeth blocker surfaces and relative rotation between the sleeve and hub, the second angled self-energizing surfaces positioned oblique to the plane and operative when engaged to react to the synchronizing torque for producing an additive axial force ($-F_a$) transmitted across the engaged blocker surfaces in the direction of the second drive means for further increasing the engagement force of the engaged friction surfaces.

5. The clutch mechanism of claim 4, wherein the self-energizing means includes:

a plurality of circumferentially spaced apart first projections extending radially outward from the outer circumference of the hub, each first projection defining the first and second surfaces affixed to the hub; and a plurality of circumferentially spaced apart projections extending radially inward from the inner circumference of the shift sleeve, each sleeve projection defining the first and second surfaces affixed to the sleeve.

6. The clutch mechanism of claim 5, wherein the self-energizing means includes:

a plurality of circumferentially spaced apart second projections extending radially outward from the outer circumference of the hub, each hub second projection defining third and fourth angled self-energizing surfaces positioned oblique to the plane, pairs of the hub first and second projections circumferentially spaced apart and the angled surfaces thereof defining a recess of hourglass like shape therebetween when viewed radially relative to the axis;

each shift sleeve projection extending into one of the recesses and including a sleeve third and a sleeve fourth angled self-energizing surface oblique to the plane, the third angled surfaces for engaging to provide the additive axial force ($+F_a$) for increasing the engaging force of the first baulkring friction surface when relative rotation of the first and second drives is opposite the one direction, the fourth angled surfaces for engaging to provide the additive axial force ($-F_a$) for increasing the engaging force of the second baulkring friction surface when the relative rotation of the third and second drives is opposite the one direction.

7. The clutch mechanism of claim 6, wherein:

each hourglass recess includes a waist portion having a hub first and a hub second nonself-energizing surface respectively defined by the hub first and second projections and extending perpendicular to the plane and circumferentially facing each other;

each sleeve projection including circumferentially oppositely facing first and second sleeve nonself-energizing surfaces respectively extending parallel to the hub first and second nonself-energizing surfaces, the nonself-energizing surfaces operative to engage each other when the shift sleeve is in the neutral position.

8. The clutch mechanism of claim 4, wherein:

the abutment means includes means for increasing rotation of the baulkring relative to the hub for changing initial contact of the blocker surfaces from substantially full initial contact to a reduced initial contact.

9. A clutch for frictionally synchronizing and positive connecting first and second drives disposed for relative rotation about a common axis; the clutch including:

first jaw means axially movable from a neutral position to an engaged position with second jaw means for positive connecting the drives in response to engaging movement of the first jaw means from a neutral position by an axially directed shift force ($F_o$) toward the second jaw means;

a first friction surface axially movable into engagement with a second friction surface in response to the engaging movement of the first jaw means for producing a synchronizing torque ($T_o$);

a hub affixed to the first drive and including an outer circumference having a plurality of circumferentially spaced apart and axially extending first grooves slidably receiving first teeth extending radially from the first jaw means;

a first baulkring including the first friction surface and a plurality of first blocker surfaces, the baulkring being axially movable away from the hub toward the second friction surface; blocker surfaces on the first jaw means to engage first blocker surfaces to prevent asynchronous engagement of the first jaw means with the second jaw means; the improvement comprising:

the hub including a first plurality of angled hub surfaces;

a plurality of self-energizing elements mounted for fixed movement with the first jaw means and limited rotational movement relative to the hub, the elements positioned to contact the angled hub surfaces for producing an additional axial force ($F_a$) in the direction of the shift force ($F_o$) due to reaction to the friction surface torque transmitted through the baulkring blocker surface thus producing increased axial force on the friction surface and increased torque for synchronizing than is available from shift force ($F_o$) alone; and the hub including a plurality of axially extending second grooves interspace between the first grooves and slidably receiving second teeth extending radially from the first jaw means, the first and second grooves respectively having at least a portion of the first and second teeth disposed therein during the neutral and engaged positions of the blockers, the grooves having a circumferential width relative to the teeth therein for allowing the relative rotation between the first jaw means and hub to effect engagement of the self-energizing means during the engaging movement of the first jaw means, and a portion of the second grooves closely receiving the second teeth when the first and second jaw means are engaged for preventing relative rotation between the first jaw means and hub.

10. The clutch of claim 9 wherein the first jaw means is attached to a shift sleeve having an axial length, the first jaw means being the first teeth and the first teeth length is less than one-half the length of the shift sleeve.

11. The clutch of claim 10 wherein the second teeth are attached to the shift sleeve and have a length less than one-half of shift sleeve length.

12. The clutch of claim 9 wherein the first grooves have a circumferential width about one and one-half the circumferential width of jaw teeth defined by the first jaw means when the shift sleeve is in the neutral position.

13. The clutch of claim 9 wherein the first grooves prevent the limited rotation when the second teeth are engaged with a fourth jaw means to limit backlash or free play between the first drive and a third drive.

14. The clutch mechanism of claim 9, wherein the self-energizing elements include:

a plurality of the self-energizing surfaces formed in the shift sleeve inner circumference and circumferentially spaced apart.

15. The clutch of claim 9, wherein the hub and at least one of the self-energizing elements each include a non-boost surface extending perpendicular to a rotational plane of the hub and engaged when the first jaw means is in a neutral position.

16. The clutch mechanism of claim 9, wherein:

the first baulkring includes an abutment means for increasing rotation of the baulkring relative to the hub for changing initial contact of the blocker surfaces from substantially full initial contact to a reduced initial contact.

17. The clutch mechanism of claim 9, further including:

third jaw means being the second teeth and axially movable from the neutral position to an engaged position with fourth jaw means for positive the first drive to a third drive in response to engaging movement of the first jaw means by an axially directed shift force ($F_o$) toward the fourth jaw means;

a third friction surface axially movable into engagement with a fourth friction surface in response to the engaging movement of the first jaw means for producing a synchronizing torque ($T_o$);

a second baulkring including a third friction surface and a plurality of second blocker surfaces, the baulkring being axially movable away from the hub toward the fourth friction surface; blocker surfaces on the second jaw means operative to engage the second blocker surfaces to prevent asynchronous engagement of the first jaw means with the second jaw means;

a plurality of self-energizing elements mounted for fixed movement with the second jaw means and the limited rotational movement relative to the hub, the elements positioned to contact the angled hub surfaces for producing an additional axial force ($F_a$) in the direction of the shift force ($F_o$) toward the fourth jaw means due to reaction to the friction surface torque transmitted through the baulkring blocker surface thus producing increased axial force on the friction surface and increased torque for synchronizing than is available from shift force ($F_o$) alone.

18. A clutch for frictionally synchronizing and positive connecting first and second drives disposed for relative rotation about a common axis; the clutch including:

a sleeve having first teeth axially movable from a neutral position to an engaged position with second teeth for positive connecting the drives in response to engaging movement of the sleeve by an axially directed shaft force ($F_o$) toward the second teeth;

a first friction means having a first friction surface axially movable into engagement with a second friction surface of a second friction means in response to the engaging movement of the sleeve for producing a synchronizing torque ($T_o$);

a hub affixed to the first drive and including an outer circumference having a plurality of circumferentially spaced apart and axially extending grooves slidably receiving the first teeth;

first blockers affixed to the first friction means;

second blockers affixed to the sleeve and engageable with the first blockers to prevent asynchronous engagement of the first and second teeth;

self-energizing means affixed to the sleeve and hub and movable into engagement in response to engagement of the blockers and relative rotation of the sleeve and hub, the self-energizing means operative when engaged to react to the synchronizing torque for producing an additive axial force ($+F_a$) transmitted across the blockers in the direction of the shift force ($+F_o$) for further increasing the engagement force of the friction surfaces; the improvement comprising:

the sleeve including third teeth; and the hub including a plurality of axially extending second grooves interspaced between the first grooves and slidably receiving the third teeth, the first and second grooves, respectively, having at least a portion of the first and third teeth disposed therein during the neutral position and during the engaged position of the blockers, the grooves having a circumferential width relative to the teeth therein for allowing the relative rotation between the sleeve and hub to effect engagement of the self-energizing means during the engaging movement of the sleeve, and a portion of the second grooves closely receiving the third teeth when the first and second teeth are engaged for preventing relative rotation between the sleeve and hub.

19. The clutch of claim 18: wherein;

the sleeve includes a flange extending radially therefrom;

the first blocker means defined by a plurality of circumferentially spaced pin-like means rigidly extending axially from the first friction member, and into openings in the flange; and the second blocker means defined about the openings.

* * * * *